(12) United States Patent  (10) Patent No.: US 8,997,334 B2
Chou  (45) Date of Patent: Apr. 7, 2015

(54) AUXILIARY TOOL FOR ASSEMBLING VOICE COIL MOTOR

(71) Applicant: Hon Hai Precision Industry Co., Ltd., New Taipei (TW)

(72) Inventor: Tzu-Nan Chou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/960,641

(22) Filed: Aug. 6, 2013

(65) Prior Publication Data

US 2013/0318783 A1 Dec. 5, 2013

Related U.S. Application Data

(62) Division of application No. 13/326,186, filed on Dec. 14, 2011, now Pat. No. 8,533,935.

(30) Foreign Application Priority Data

May 16, 2011 (TW) .............................. 100117121 A

(51) Int. Cl.
G11B 5/127 (2006.01)
H02K 15/00 (2006.01)
H02K 41/035 (2006.01)

(52) U.S. Cl.
CPC ............ *H02K 15/00* (2013.01); *H02K 41/0356* (2013.01)

(58) Field of Classification Search
CPC .......................... H02K 41/0356; H02K 15/00
USPC ................ 29/603.3, 603.18, 732, 739, 592.1, 29/596–598; 360/104–106, 264.2–264.9, 360/265
See application file for complete search history.

(56) References Cited

U.S. PATENT DOCUMENTS

| | | | | |
|---|---|---|---|---|
| 4,151,430 A | * | 4/1979 | Stark | 310/90 |
| 5,580,416 A | * | 12/1996 | Lin et al. | 156/425 |
| 5,645,668 A | * | 7/1997 | Lin et al. | 156/175 |
| 8,533,935 B2 | * | 9/2013 | Chou | 29/603.03 |
| 2005/0283971 A1 | * | 12/2005 | Erpelding | 29/605 |

* cited by examiner

*Primary Examiner* — Minh Trinh
(74) *Attorney, Agent, or Firm* — Novak Druce Connolly Bove + Quigg LLP

(57) ABSTRACT

An auxiliary tool for assembling a number of voice coil motors includes a number of trays, a rod member, and two limiting members. Each tray defines a through hole. The rod member passes through the through holes of the trays. The two limiting members are sleeved over the rod member at two ends of the rod member, the trays being between the two limiting members, each two neighboring trays being configured for clamping a respective one of the voice coil motors.

10 Claims, 4 Drawing Sheets

AUXILIARY TOOL FOR ASSEMBLING VOICE COIL MOTOR

CROSS REFERENCE

This application is a divisional application of patent application Ser. No. 13/326,186 filed on Dec. 14, 2011 from which it claims the benefit of priority under 35 U.S.C. 120. The patent application Ser. No. 13/326,186 in turn claims the benefit of priority under 35 USC 119 from Taiwan Patent Application 100117121, filed on May 16, 2011.

BACKGROUND

1. Technical Field

The present disclosure relates to voice coil motors (VCMs) and, particularly, to an auxiliary tool for assembling the VCMs.

2. Description of Related Art

Voice coil motors (VCMs) usually include a base, an actuator, a stator for receiving the actuator, two elastic plates, and a metallic shell for casing the stator and the elastic plates. When being assembled, one of the elastic plates is arranged on the base and is pre-fixed to the base by ultraviolet adhesive. One end of the actuator is seated on the first elastic plate and then is sleeved in the stator. The other elastic plate is mounted to the other end of the actuator and is prefixed to the stator by ultraviolet adhesive. Then the stator is housed in the shell. After assembling, the VCM is applied with thermosetting adhesive and is heated to connect the elastic plates, the base, and the stator. However, it increases cost and reduces assembling efficiency by pre-fixing the elastic plates by the ultraviolet adhesive.

Therefore, it is desirable to provide a tool, which can overcome the limitations described above.

DETAILED DESCRIPTION

Embodiments of the present disclosure will now be described in detail with reference to the drawings.

Figure 1:
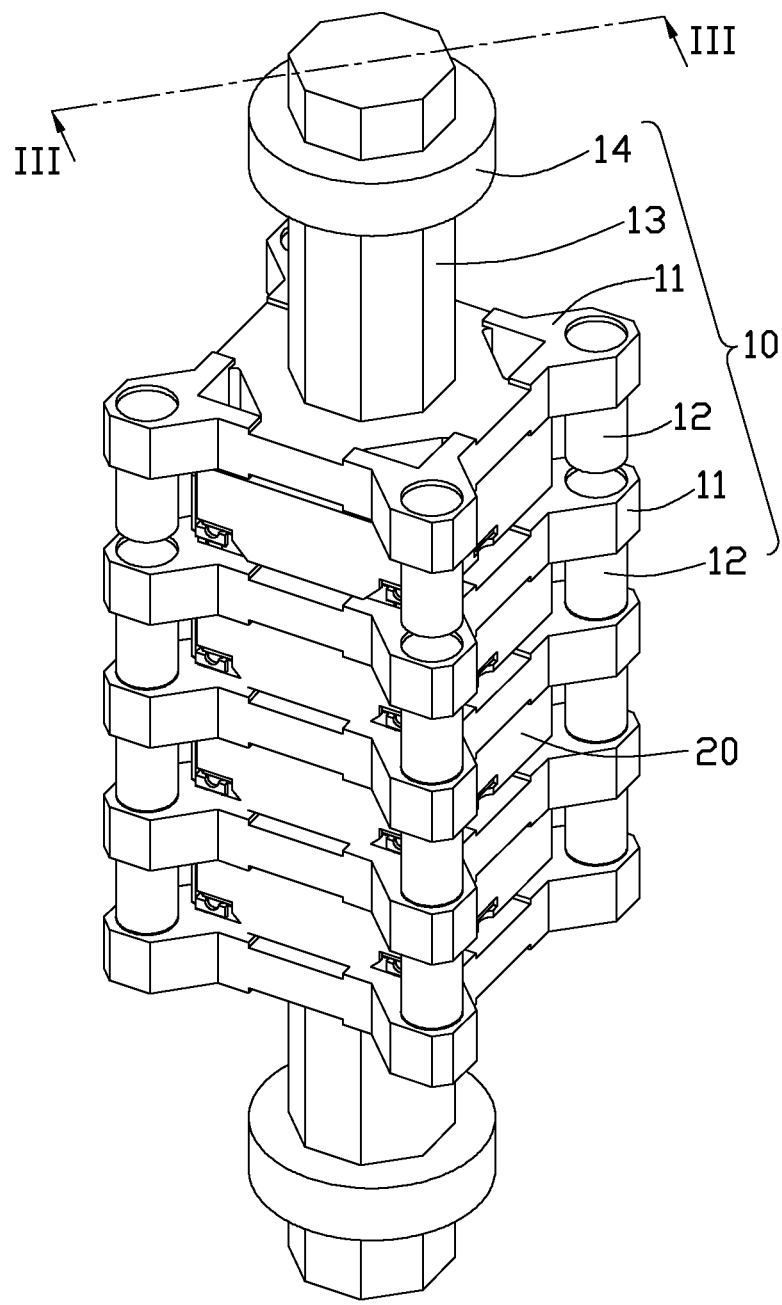
FIG. 1 is an isometric, assembled view of an auxiliary tool for assembling voice coil motors according to an exemplary embodiment.
Figure 2:
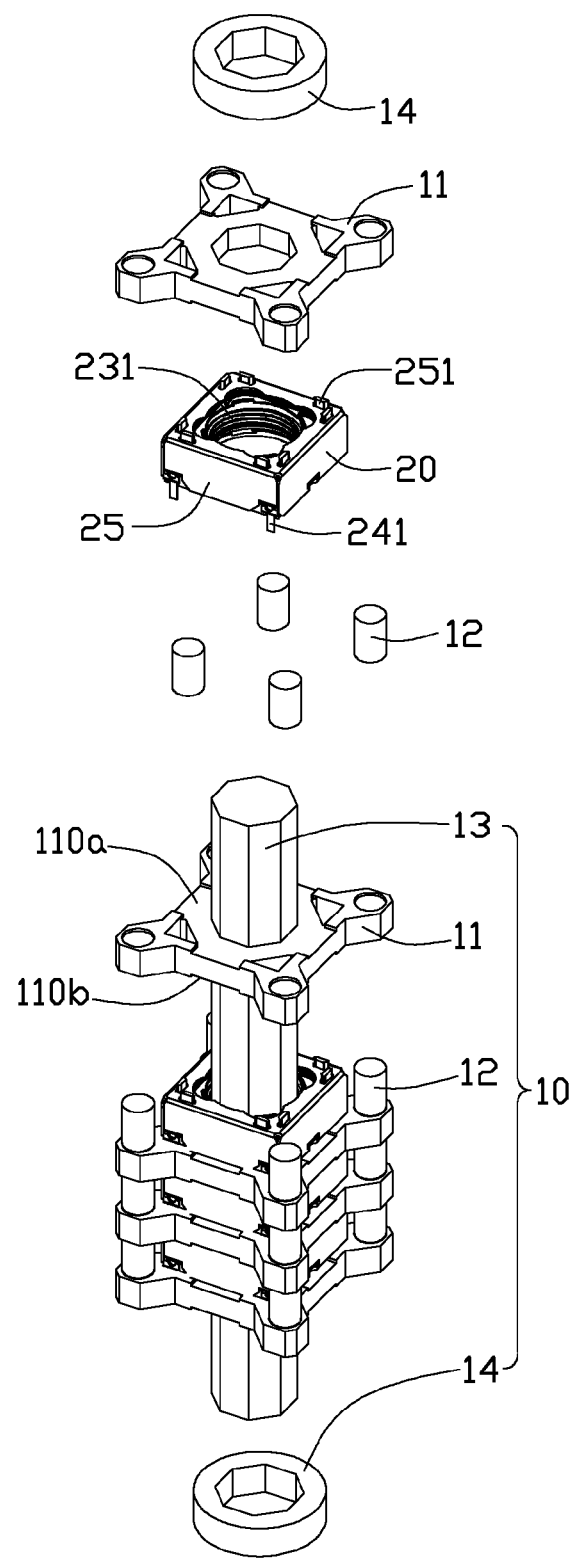
FIG. 2 is an isometric, partially assembled view of the auxiliary tool for assembling voice coil motors of FIG. 1.
Figure 3:
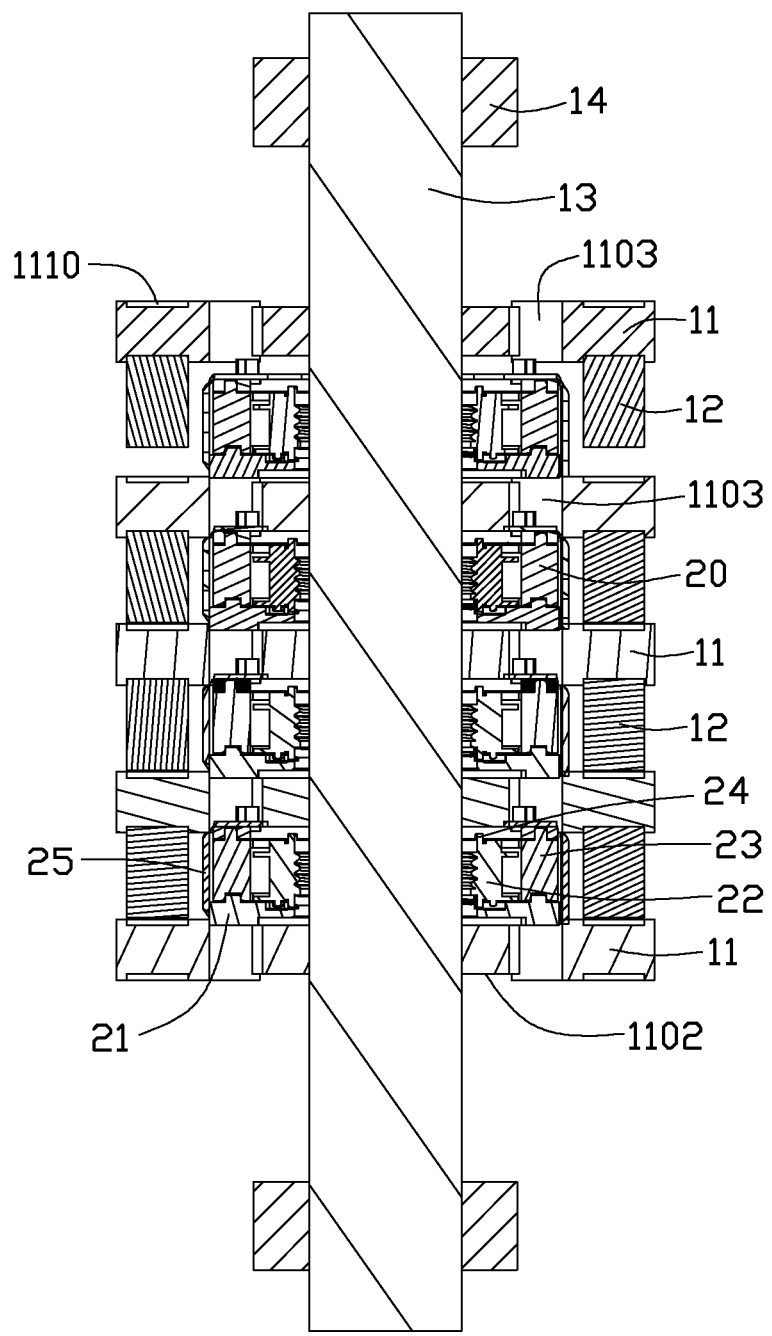
FIG. 3 is a cross-sectional view of the auxiliary tool for assembling voice coil motors of FIG. 1.

FIG. 1 to FIG. 3 show an auxiliary tool 10 used for assembling a number of voice coil motors (VCMs) 20, according to an exemplary embodiment.

Each of the VCMs 20 includes a base 21, an actuator 22, a stator 23, two elastic plates 24, and a metallic shell 25. The actuator 22 is tubular and defines a threaded hole 231. The threaded hole 231 can be engaged with a lens module (not shown). The elastic plates 24 include two extending electrodes 241. The shell 25 includes two end surfaces and defines a center hole passing through the end surfaces for receiving the actuator 22. The shell 25 includes a number of protrusions 251 extending up from one of the end surfaces of the metallic shell 25.

The auxiliary tool 10 includes a number of trays 11, a number of support pins 12, a rod member 13, and two limiting members 14.

Figure 4:
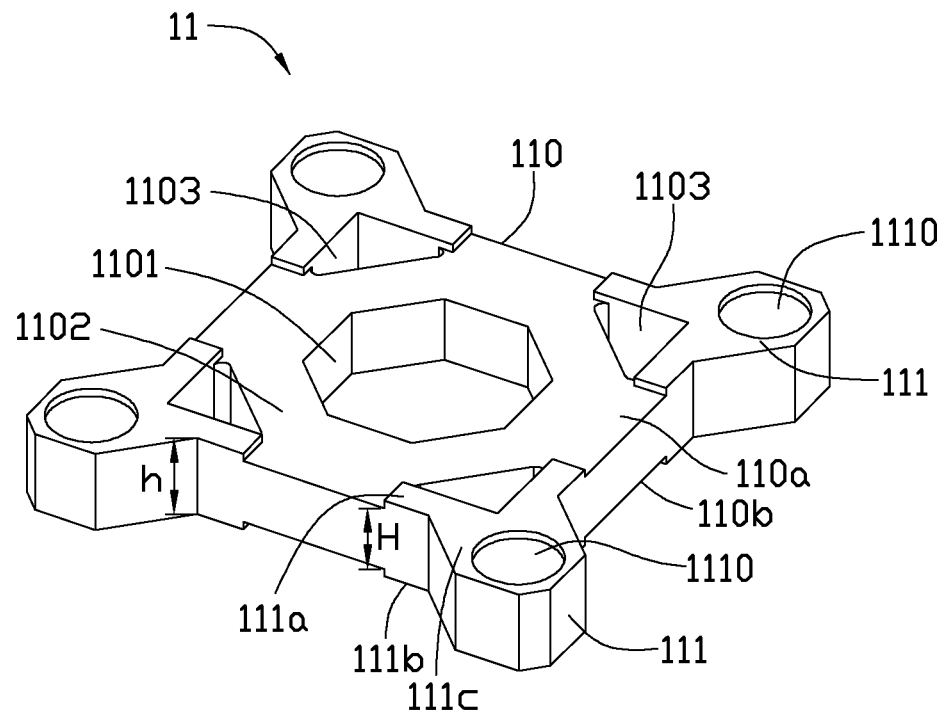
FIG. 4 is an isometric view of a tray of the auxiliary tool for assembling voice coil motors of FIG. 1.

FIG. 4 shows that each of the trays 11 includes a main portion 110 and four support arms 111. The main portion 110 is cuboid and includes a planar top surface 110a and a planar bottom surface 110b opposite to the top surface 110a. The main portion 110 defines a through hole 1101 passing through a central portion of the top surface 110a and the bottom surface 110b. The through hole 1101 is polygonal. In this embodiment, the through hole 1101 is a regular octagon. In alterative embodiments, the through hole 1101 can be circular or squared.

The four support arms 111 extend out from four corners of the main portion 110 and are symmetrical about a central axis of the main portion 110. Each support arm 111 includes a first protruding portion 111a, a second protruding portion 111b, and an end portion 111c. The first protruding portion 111a is generally L-shaped and extends up from the top surface 110a. The second protruding portion 111b is also L-shaped and extends up from the bottom surface 110b. The end portion 111c is connected to the first protruding portion 111a and the second protruding portion 111b. The end portion 111c extends away from the main portion 110. A thickness H of the main portion 110 between the top surface 110a and the bottom surface 110b is less than a thickness h of each support arm 111 between the first protruding portion 111a and the second protruding portion 111b. Four first protruding portions 111a of the four support arms 111 and the top surface 110a cooperatively define a receiving space 1102. Four second protruding portions 111b of the four support arms 111 and the bottom surface 110b cooperatively define another receiving space 1102. The two receiving spaces 1102 are respectively on the top surface 110a and the bottom surface 110b. The end portion 111c defines two circular blind holes 1110 opposite to and coaxial with each other. The main portion 110 further defines four openings 1103 passing through the top surface 110a and the bottom surface 110b. Each opening 1103 is adjacent to a respective one of the support arms 111.

Each of the support pins 12 is cylindrical and spatially corresponds to a blind hole 1110.

The rod member 13 is spatially corresponding to the through hole 1101 and can be passed through the through hole 1101.

Each of the limiting members 14 is generally annular and can be sleeved over the rod member 13 to engage with the rod member 13.

FIG. 2 to FIG. 4 show that when assembling VCMs 20, for example assembling one of a first VCM 20. One of a first tray 11 is disposed on a worktable (not shown). The base 21 is seated on the top surface 110a of the first tray 11 with the extending electrodes 241 received in the openings 1103. One of the elastic plates 24 is arranged on the base 21. Thermosetting adhesive is applied between the base 21 and the elastic plate 24 arranged on the base 21. Then, the actuator 22 is seated on the elastic plate 24 arranged on the base 21. Then the stator 23 is sleeved outside the actuator 22. The other elastic plate 24 is attached on the actuator 22. Thermosetting adhesive is applied between the stator 23 and the elastic plate 24 attached on the actuator 22. Then the shell 25 is engaged with the base 21 to house the actuator 22, the stator 23, and the elastic plates 24. The first VCM 20 is partially received in one receiving space 1102 of the first tray 11. One end of each support pin 12 is received in a blind hole 1110 of the first tray 11. One of a second tray 11 is attached to the first VCM 20 with the other end of each support pin 12 received in a blind hole 1110 of the second tray 11 and the protrusions 251 received in the openings 1103 of the second tray 11. Four support pins 12 are mounted between the first and the second trays 11. The first VCM 20 is also partially received in one receiving space 1102 of the second tray 11 neighboring the first tray. The first VCM 20 is clamped by two neighboring trays 11, namely, by the first and the second trays 11. The four support pins 12 mounted between the first and the second trays 11 to make the second tray 11 attach on the first VCM 20 to prevent the second tray 11 pressing and damaging the first VCM 20 and further allowing the second tray 11 to correctly and quickly align with first tray 11. The assembling procedures of other VCMs 20 are similar to the first VCM 20. When all the VCMs 20 have been assembled, each VCM 20 is clamped by two neighboring trays 11. The rod member 13 passes through the threaded hole 231 of each VCM 20 and passes the through hole 1101 of each tray 11. The limiting members 14 are respectively sleeved over two ends of the rod member 13 and attached on two outmost trays 11. Therefore, all of the trays 11 and the VCMs 20 are steadily limited between the limiting members 14.

After assembling, the auxiliary tool 10 loaded with the VCMs 20 is placed in an oven and heated under a determined temperature such that the base 21 and one of the elastic plates 24 of each VCM 20 are steadily connected with each other by the thermosetting adhesive. The stator 23 and the other elastic plate 24 of each VCM 20 are steadily connected with each other by the thermosetting adhesive.

In alterative embodiment, the auxiliary tool 10 does not include the support pins 12 when each VCM 20 has sufficient strength to avoid being damaged.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. An auxiliary tool for assembling a number of voice coil motors, comprising:
   a number of trays, each tray defining a through hole;
   a rod member passing through the through holes of the trays;
   two limiting members sleeved over the rod member at two ends of the rod member, the trays being limited between the two limiting members, each two neighboring trays being configured for clamping a respective one of the voice coil motors; and
   a plurality of support pins mounted between each two neighboring trays, and each tray being aligned with another neighboring tray by the support pins.

2. The auxiliary tool of claim 1, wherein each of the trays comprises a main portion and a plurality of support arms extending away from the main portion, the main portion comprises a top surface and a bottom surface opposite to the top surface; the support arms and the main portion cooperatively defines two receiving spaces respectively on the top surface and the bottom surface, each voice coil motor being received in two receiving spaces of two neighboring trays and clamped by the two neighboring trays when the voice coil motor being assembled, with the receiving space on the top surface of one of the two neighboring trays and the other receiving space on the bottom surface of the other one of the two neighboring trays cooperatively receiving a respective voice coil motor.

3. An auxiliary tool for assembling a number of voice coil motors, comprising:
   a number of trays, each tray defining a through hole;
   a rod member passing through the through holes of the trays; and
   two limiting members sleeved over the rod member at two ends of the rod member, the trays being limited between the two limiting members, each two neighboring trays being configured for clamping a respective one of the voice coil motors
   wherein each of the trays comprises a main portion and a plurality of support arms extending away from the main portion, the main portion comprises a top surface and a bottom surface opposite to the top surface; the support arms and the main portion cooperatively defines two receiving spaces respectively on the top surface and the bottom surface, each voice coil motor being received in two receiving spaces of two neighboring trays and clamped by the two neighboring trays when the voice coil motor being assembled, with the receiving space on the top surface of one of the two neighboring trays and the other receiving space on the bottom surface of the other one of the two neighboring trays cooperatively receiving a respective voice coil motor.

4. The auxiliary tool of claim 3, wherein the plurality of support arms comprises four support arms, and the four support arms extends out from corners of the main portion and are symmetrical about a central axis of the main portion.

5. The auxiliary tool of claim 3, wherein each support arm comprises a first protruding portion, a second protruding portion, and an end portion, the first protruding portion extends up from the top surface, the second protruding portion extends up from the bottom surface, the end portion is connected to the first protruding portion and the second protruding portion, and the end portion extends away from the main portion.

6. The auxiliary tool of claim 5, wherein the first protruding portion is substantially L-shaped, and the second protruding portion is substantially L-shaped.

7. The auxiliary tool of claim 5, wherein a thickness of the main portion between the top surface and the bottom surface is less than a thickness of each support arm between the first protruding portion and the second protruding portion.

8. The auxiliary tool of claim 5, wherein the first protruding portions of the support arms and the top surface cooperatively define one of the two receiving spaces, and the second protruding portions of the support arms and the bottom surface cooperatively define the other one of the two receiving spaces.

9. The auxiliary tool of claim 5, further comprising a plurality of support pins mounted between each two neighboring trays, wherein the end portion defines two blind holes opposite to and coaxial with each other, and the and each tray is aligned with another neighboring tray in a manner that opposite ends of each support pin are respectively received in the two blind holes.

10. The auxiliary tool of claim 5, wherein the main portion defines a plurality of openings passing through the top surface and the bottom surface and corresponding to the plurality of support arms, and each opening is adjacent to a respective one of the support arms.

* * * * *